US008566242B2

(12) United States Patent
Chu (10) Patent No.: US 8,566,242 B2
(45) Date of Patent: Oct. 22, 2013

(54) NETWORK-BASED CONSUMER TRANSACTIONS WITH CREDIT ACCOUNTS

(75) Inventor: Peter Zhe Chu, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 195 days.

(21) Appl. No.: 11/603,476

(22) Filed: Nov. 22, 2006

(65) Prior Publication Data

US 2008/0120235 A1 May 22, 2008

(51) Int. Cl.
G06Q 40/00 (2012.01)
(52) U.S. Cl.
USPC ............... 705/44; 705/39; 705/35; 705/26.1; 705/1.1
(58) Field of Classification Search
USPC ......... 705/1, 44, 38, 1.1, 39, 35, 26.1, 40, 27, 705/14; 235/380, 379; 726/1
See application file for complete search history.

(56) References Cited

U.S. PATENT DOCUMENTS

| 6,882,984 | B1 * | 4/2005 | Boyle et al. | 705/35 |
| 6,938,019 | B1 * | 8/2005 | Uzo | 705/65 |
| 2003/0105709 | A1 * | 6/2003 | Orlando | 705/39 |
| 2005/0033688 | A1 * | 2/2005 | Peart et al. | 705/39 |
| 2005/0116028 | A1 * | 6/2005 | Cohen et al. | 235/380 |

* cited by examiner

*Primary Examiner* — John H Holly
(74) *Attorney, Agent, or Firm* — Schwegman Lundberg & Woessner, P.A.

(57) ABSTRACT

A computer-implemented method and system is operable to: receive a purchase transaction from a purchaser, the purchase transaction including purchase transaction information including a purchaser credit number associated with a purchaser credit account previously established on a payment site, use the purchaser credit number to obtain associated purchaser credit account information maintained at a payment site, receive from the payment site a disposition of the purchase transaction, and receive from the payment site purchaser-specific information to streamline the purchase transaction.

27 Claims, 10 Drawing Sheets

NETWORK-BASED CONSUMER TRANSACTIONS WITH CREDIT ACCOUNTS

BACKGROUND

1. Technical Field

This disclosure relates to methods and systems supporting online consumer transactions by a user. More particularly, the present disclosure relates to network-based consumer transactions with credit accounts.

2. Related Art

Conventional network-based marketplaces (e.g. consumer websites) provide users with functionality to browse a collection of goods or services at a website and make purchases using a variety of means. For example, conventional credit cards can be used for an online purchase. In this case, the user enters the credit card number into a data field on a web form provided by a merchant or third party website. Conventional debit cards can be similarly used. Using these conventional financial systems and processes on the Web, users can shop and make purchases of goods or services over the Internet. Unfortunately, however, the user/purchaser's credit or debit card numbers become vulnerable to discovery and misuse once the card numbers are entered into a web form. Further, the credit card companies charge a fee for processing the credit transaction.

The PayPal system is also a popular example of a conventional financial system and process to facilitate online consumer transactions. The PayPal system provides a user account created for each user wherein a user associates his/her credit card, debit card, or bank account with the PayPal account. Subsequently, the user can make secure purchases using the PayPal account without revealing his/her credit card number or financial information. However, when a user makes a purchase at a merchant site, the user must separately log in to the PayPal site to gain access to their PayPal account in order to complete the consumer transaction at the merchant site. This separate log in process can be cumbersome and slow for the consumer.

Thus, a system and method supporting network-based consumer transactions with credit accounts are needed.

BRIEF DESCRIPTION OF THE DRAWINGS

Embodiments illustrated by way of example and not limitation in the figures of the accompanying drawings, in which.

DETAILED DESCRIPTION

A computer-implemented system and method supporting network-based consumer transactions with credit accounts are disclosed. In the following description, numerous specific details are set forth. However, it is understood that embodiments may be practiced without these specific details. In other instances, well-known processes, structures and techniques have not been shown in detail in order not to obscure the clarity of this description.

As described further below, according to various example embodiments of the disclosed subject matter described and claimed herein, there is provided a system and method supporting network-based consumer transactions with credit accounts. The system includes a payment processor to recognize a unique credit number and automatically initiate communication with a payment site to request authorization and payment from the payment site for an online transaction. Various embodiments are described below in connection with the figures provided herein.

Figure 1:
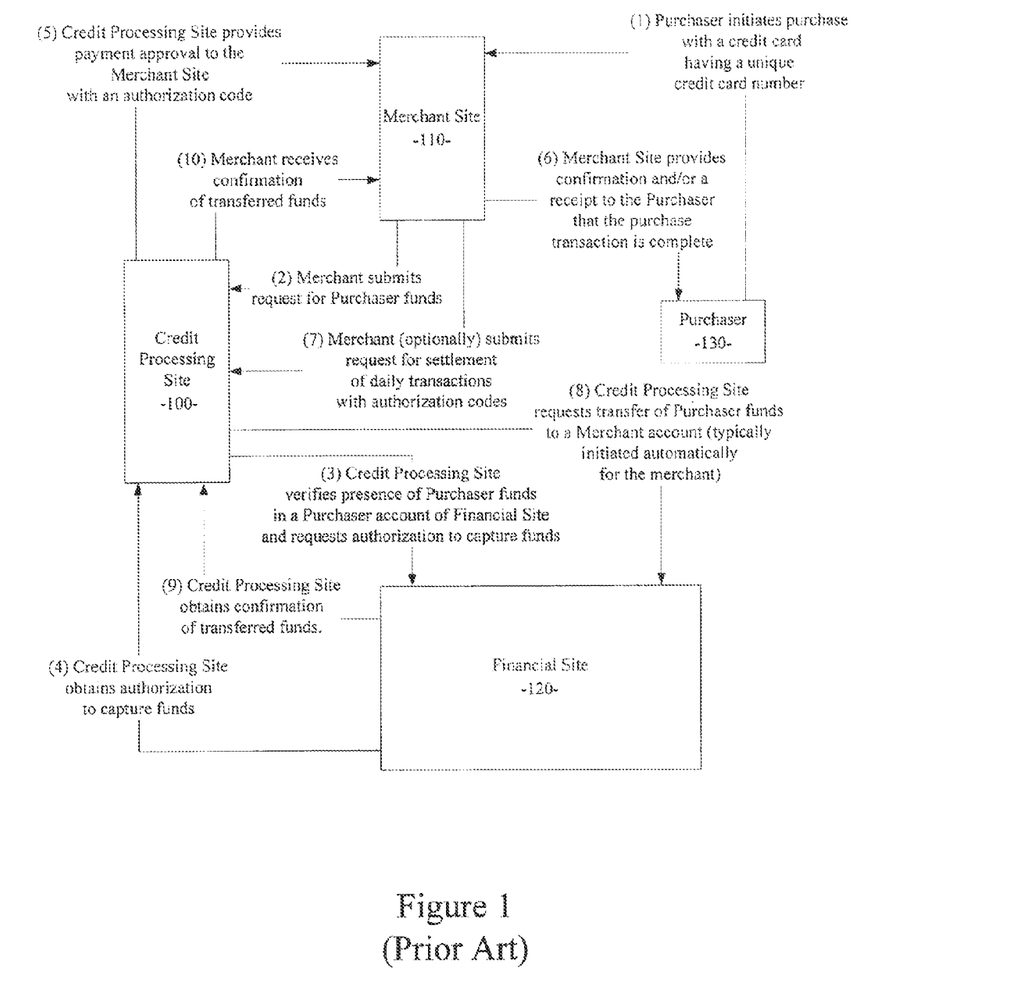
FIG. 1 illustrates a conventional credit card transaction between a purchaser and a merchant.

Referring to FIG. 1, a conventional credit card transaction between a purchaser and a merchant is illustrated. Initially, a merchant account is required to accept credit cards, (e.g. Visa & MasterCard). A merchant account is a special account with a bank that is a member of the Visa and MasterCard associations. Such a bank has been certified by Visa and MasterCard associations and can provide the merchant with all of the services related to the merchant account and related credit card transactions. Once the merchant account is set up and "live" on the credit card system, the merchant can accept credit cards from customers generally as follows:

1. A customer/purchaser 130 presents their credit card number to a merchant site 110 for payment related to an online transaction between the purchaser 130 and the merchant represented by the merchant site 110.
2. Using the purchaser 130 credit card number, the merchant site 110 submits an electronic request to the processing network for "authorization to capture funds" from the cardholder's credit card account in the amount of the purchase. Traditionally, one would submit this request by swiping a credit card through an electronic transaction terminal provided by the merchant account provider. With Payment Gateways, this request is provided electronically to a set of payment gateway servers, which then route the request along the processing network to a credit processing site 100.
3. The credit processing site 100 immediately receives the merchant's electronic request and determines if the purchaser/cardholder's account is valid and if the funds are available. In some cases, the credit processing site 100 may access a financial site 120 (e.g. a bank, credit union, credit card company, etc.) to determine if the purchaser funds are available.
4. If the funds are available, the credit processing site 100 obtains authorization to capture the funds.
5. The credit processing site 100 returns an electronic response to the merchant site 10. This response is called an "authorization code", and is the merchant's guaranteed authorization to capture the Purchaser 130 funds. Typically, this code is a six-digit number. The transaction and its associated authorization are typically stored in a "batch", where other transactions for that day reside.
6. The merchant site 110 provides a confirmation or receipt for the Purchaser 130 using a webpage, for example, for an online transaction. The receipt confirms the completion of the purchase and the capture of the Purchaser 130 funds. As far as the purchaser 130 is concerned, the online transaction is complete. As far as the merchant site 110 is concerned, there are typically additional steps to complete the transaction.

7. At the end of the merchant's business day (usually), the merchant may optionally submit a final request to the credit processing site 100 to go ahead and "capture the purchaser funds" for which the merchant site 110 obtained authorizations during the course of business that day. This is called "settlement" or "settling the batch". This request is also submitted using the electronic terminal or computer. In other implementations, this request is automatically generated for the merchant without the merchant having to make the request explicitly. The credit processing site 100 immediately processes the merchant's request electronically and determines if the capture amounts contained in the merchant's batch of transactions match the authorizations for each item.
8. If the capture amounts contained in the merchant's batch of transactions match the authorizations for each item, the merchant's request for funds transfer is granted and the credit processing site 100 requests the financial site 120 to transfer the Purchaser 130 funds to a Merchant account.
9. The credit processing site 100 obtains confirmation of the transferred funds from the financial site 120.
10. The credit processing site 100 sends an "Accepted" response to the merchant site 110 confirming the transfer of funds to the merchant account. A settlement report can be printed showing the grand totals by card type (e.g. Visa, MasterCard, American Express, Discover, etc.) for the settled batch. Any corrections to the merchant's batch, such as voiding a transaction, must be made prior to settlement. Typically within 48 to 72 hours (usually), the funds associated with the batch the merchant settled are deposited electronically into the merchant's business bank account. Typically, the discount rate the merchant pays to the merchant account provider is deducted from the deposit before the funds are transferred to the merchant's bank account, resulting in a "net deposit" of funds. At the end of the month, the merchant account provider typically emails or mails a statement to the merchant, detailing the credit card activity for the month and the associated fees the merchant has been charged for such.

Figure 2:
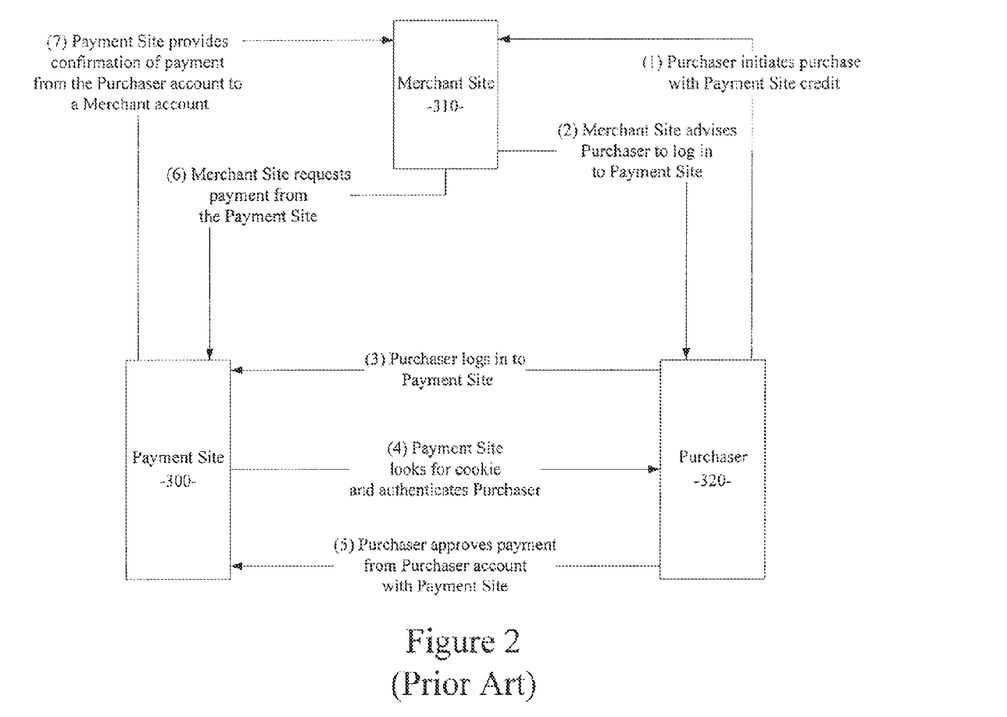
FIG. 2 illustrates a conventional sequence of operations related to a user purchase transaction.

Referring now to FIG. 2, a sequence of operations related to a user purchase transaction is illustrated. In this example, the purchaser uses credit maintained by a payment site 300, such as PayPal. In a first event, a purchaser 320 initiates a purchase transaction with a merchant site 310 using credit provided by the payment site 300. In this embodiment, purchaser 320 uses a credit account previously established on payment site 300. When the purchaser 320 initiates the purchase with payment site credit, the merchant site 310 advises the purchaser 320 to log into the payment site 300 to authorize payment.

In order to use the payment site 300 credit account and to authorize payment from this account, purchaser 320 logs into payment site 300 to access the purchaser account. Upon purchaser 320 login at payment site 300, payment site 300 attempts to access (e.g., by searching for) a cookie or data object that may have previously been deposited on the system of purchaser 320 by payment site 300. Typically, when the purchaser 320 initially accesses the payment site 300 and opens a credit account with the payment site 300 (in a prior log-in session), the payment site 300 will generate a cookie with user-specific information and transfer this cookie to the purchaser 320 system using well known techniques. If the cookie is not found on the purchaser 320 system, the purchaser may have to provide additional information to validate the identity and authorization of the purchaser 320 to access the payment site 300 credit account. If the cookie is found, the cookie is examined to determine if the purchaser 320 who initiated the purchase transaction with the merchant site 310 is authorized to access the payment site 300 credit account and to withdraw funds therefrom. It will be apparent to those of ordinary skill in the art that many other well-known techniques can be used to validate the identity and authorization of the purchaser 320. Once the identity and authorization of the purchaser 320 is verified, the purchaser 320 can approve payment from the purchaser credit account with the payment site 300. As part of the purchase transaction, the merchant site 310 requests payment from the purchaser 320 account for the purchase transaction. If the verified purchaser 320 approves payment from the purchaser credit account, the payment site 300 can transfer funds from the purchaser 320 to the merchant site 310 account in response to the merchant site 310 request for payment. Once this funds transfer is completed or authorized, the payment site 300 can provide confirmation of the payment to the merchant site 310. The merchant site 310 can subsequently complete the purchase transaction with the purchaser 320.

According to various embodiments described below and illustrated in FIGS. 3-7, a payment site 330 operates in concert with a payment processor 345 to recognize a unique credit number and automatically initiate communication with the payment site 330 to request authorization and payment for an online transaction from a purchaser 350 credit account maintained at or by the payment site 330.

Figure 3:
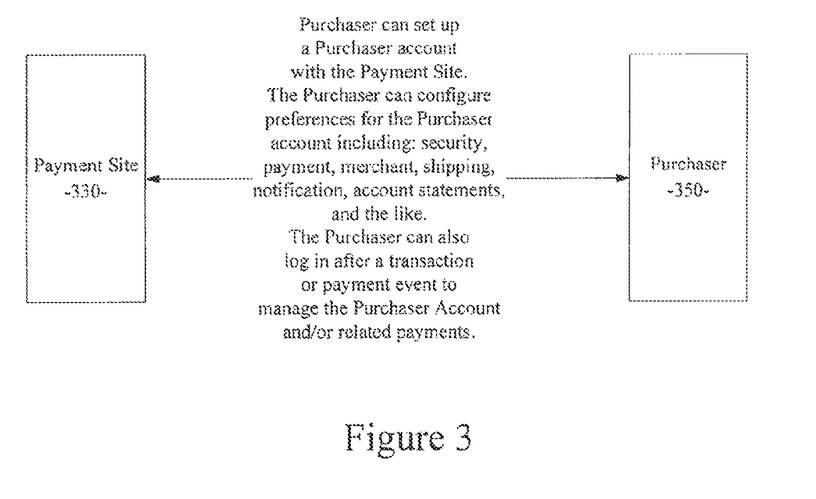
FIG. 3 illustrates a purchase account set up according to various example embodiments.

As shown in FIG. 3, a purchaser 350 can initially set up a purchaser credit account with the payment site 330. The purchaser 350 can configure preferences for the purchaser account including: security, payment, merchant, shipping, notification, account statements, and the like. The purchaser 350 can also log in after a transaction or payment event is completed to manage the purchaser account and/or related payments. As part of creating and configuring the purchaser credit account, the purchaser can define a unique credit number associated with the purchaser credit account on payment site 330. The unique credit number can be any unique combination of letters, numbers, or symbols (denoted the credit number herein) that is different from existing credit card numbers. A unique block of numbers, letters, or symbols can be determined given the standardization in traditional credit card numbering methods. The unique block of numbers, letters, or symbols can be defined to include a marker symbol that identifies each unique credit number as belonging to the unique block of numbers, letters, or symbols being used by the payment site 330 for credit numbers. For example, a leading digit of known value (e.g. 9) can provide the marker symbol. The credit number can be of a fixed number of digits/positions or a variable number of digits/positions, as long as the resulting credit number is unique. The credit number can be defined by the purchaser 350 when the purchaser credit account is created/set up or the credit number can be specified or suggested by the payment site 330. The unique credit number associates a particular purchaser 350 with a corresponding credit account on payment site 330. The purchaser 350 provides the credit number to a merchant when a purchase transaction is initiated by the purchaser 350. Once the purchaser 350 selects or is assigned a credit number, the credit number is retained by the payment site 330 and associated with the purchaser credit account. By creating unique credit numbers associated with corresponding credit accounts, the purchaser 350 can control the set of merchants enabled for access to the purchaser 350 credit accounts and the purchaser 350 can control the authorization process the merchant must use to gain access to a purchaser 350 credit account. Further, the purchaser 350 can readily change the access privileges and access process for particular merchants by accessing the purchaser credit account on the payment site 330.

As an additional security feature, the purchaser 350 can also create or modify a Credit Verification Value (CVV) associated with the purchaser credit account. The CVV is similar to the traditional CVV2 number associated with a conventional credit card, except the CVV of various embodiments can be readily changed by the purchaser 350 at any time by accessing the purchaser credit account on the payment site 330. In contrast, conventional CVV2 numbers on conventional credit cards are fixed at the time the credit card is created. In the various embodiments described herein, the CVV can be an arbitrary series of letters, numbers, or symbols of fixed or variable length that is defined by the purchaser 350 and retained by the payment site 330 with the purchaser credit account. As stated earlier, the CVV can be changed by the purchaser 350 at any time by accessing the purchaser credit account on the payment site 330. Once the purchaser 350 selects or changes a CVV, the CVV is retained by the payment site 330 and associated with the purchaser credit account.

Figure 4:
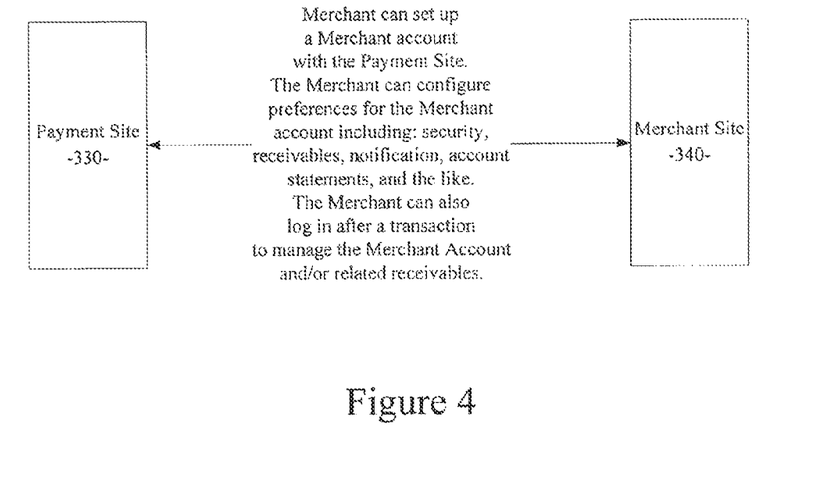
FIG. 4 illustrates a merchant account set up according to various example embodiments.
Figure 5:
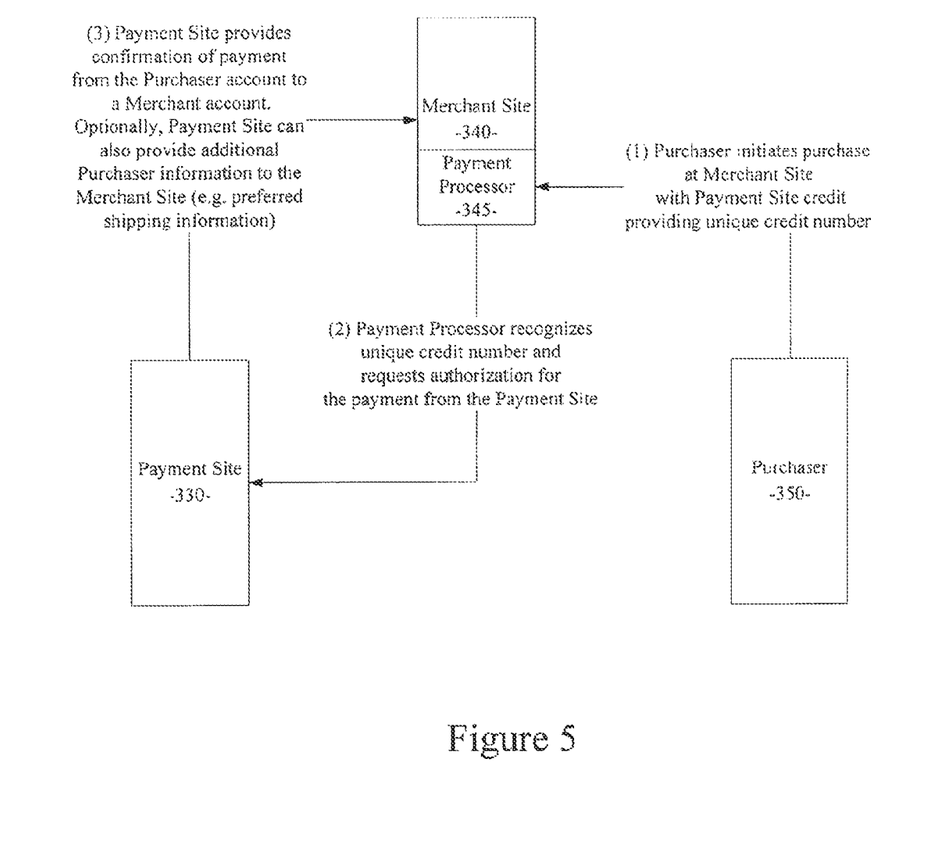
FIGS. 5-6 illustrates a purchase transaction according to various example embodiments.
Figure 6:
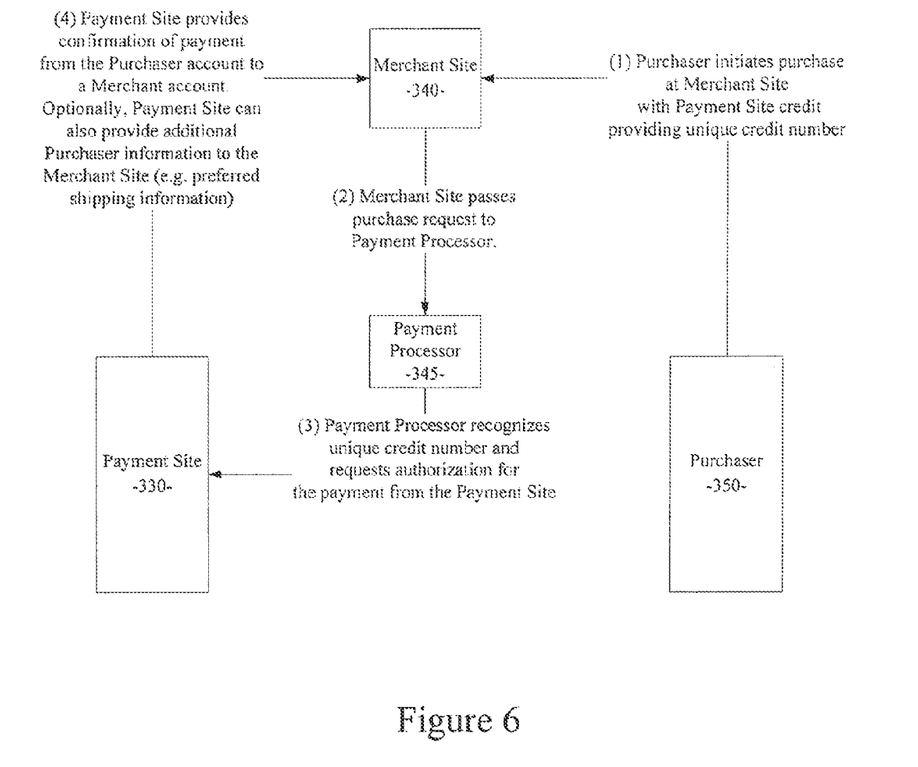

As shown in FIG. 4, a merchant represented by the merchant site 340 can initially set up a merchant account with the payment site 330. The merchant can configure preferences for the merchant account including: security, receivables, notification, account statements, and the like. The merchant can also log in after the completion of a transaction to manage the merchant account and/or related receivables. The merchant can specify the manner in which payment is made into the merchant account and the frequency and time when account statements are generated. As part of the creation and configuration of the merchant account, the merchant site 340 is associated with a payment processor 345. Payment processor 345 can be implemented as a software component that can be downloaded into the merchant site 340, configured for use with the merchant site 340 but resident in the payment site 330, or configured for use with the merchant site 340 but resident at a third party site. FIG. 5 illustrates the payment processor 345 as resident at the merchant site 340. FIG. 6 illustrates the payment processor 345 as resident at a third party site. In any of these configurations, the payment processor 345 receives (or is forwarded from a merchant site) a purchaser 350 purchase request. As illustrated in FIG. 5, a payment site 330 credit number is provided by the purchaser 350 to the payment processor 345. As described above, the purchaser credit number is uniquely associated with the purchaser's account that was previously set up on payment site 330. As an optional security measure, the purchaser 350 can also create or modify a Credit Verification Value (CVV) associated with the purchaser credit account as described above.

Referring to FIG. 5, after the purchaser 350 credit account and the merchant account associated with the merchant site 340 has been set up with the payment site 330 as described above, the purchaser 350 can initiate a purchase transaction with the merchant site 340 using the purchaser credit account. FIG. 5 illustrates an example embodiment in which a payment site 330 operates in concert with a payment processor 345 to recognize a unique credit number (and optionally a related CVV) and automatically initiate communication with the payment site 330 to request authorization and payment for an online transaction from a purchaser 350 credit account maintained at or by the payment site 330. In an initial action, the purchaser 350 initiates a purchase transaction at the merchant site 340 by providing the purchaser's unique credit number to the merchant site 340. The merchant site 340 is pre-configured to receive such purchase transactions through the payment processor 345. FIG. 5 illustrates an embodiment in which the payment processor 345 is integral to the merchant site 340 as either a downloaded software component or a service running on a server directly coupled to a merchant site 340 server. An alternative embodiment is illustrated in FIG. 6 wherein the payment processor 345 is loosely coupled to the merchant site 340 either through an indirect connection to a merchant site 340 server or coupled to the merchant site 340 via a secure network connection. In any of these equivalent connections, payment processor 345 handles the receipt of the purchase transaction from a purchaser 350 and performs the pre-processing of the transaction prior to forwarding the purchase transaction to the payment site 330. By virtue of the unique credit number provided by the purchaser 350, the payment processor 345 can determine that the purchase transaction is a request by the purchaser 350 to transfer funds from a purchaser credit account previously established on the payment site 330 by the purchaser 350. In this manner, the payment processor 345 can automatically associate the unique credit number provided by the purchaser 350 with a purchaser credit account previously established on the payment site 330. Once the payment processor 345 recognizes the unique credit number as a payment site 330 account number, the payment processor 345 communicates with payment site 330 to request authorization to transfer funds from the purchaser credit account to the merchant account associated with the merchant site, which was also previously established on the payment site 330. As an additional level of identity verification in an alternative embodiment, the payment processor 345 can also request the purchaser 350 to provide the CVV that is associated with the purchaser credit account previously established on the payment site 330. The payment processor 345 can forward the CVV to the payment site 330 as part of the purchase transaction. Using the purchaser 350 information provided with the purchase transaction, the credit number, and optionally the CVV, the payment site 330 can authorize or decline the transfer of funds from the purchaser credit account to the merchant account. The purchaser 350 information provided with the purchase transaction can include the purchaser name, address, date of birth, and other purchaser 350 proprietary information sufficient to establish proof of the purchaser's identity. In other embodiments, varying levels of purchaser 350 proprietary information or other identity information can be requested to verify identity. For example, other embodiments may require a digital certificate, password, or public key as an additional level of identity proof. In other embodiments, the level of identity proof required may be varied based on the amount of the transaction, the location of the purchaser, or the requirements of the specific merchant associated with merchant site 340.

Once the payment site 330 processes the purchase transaction provided by the payment processor 345, the payment site can authorize or decline the transfer of funds from the purchaser credit account to the merchant account. If the purchase transaction is approved, the payment site 330 provides confirmation of payment from the purchaser 350 credit account to a merchant account associated with merchant site 340. Optionally, the payment site 330 can also provide additional purchaser 350 information to the merchant site 340 (e.g. purchaser preferred shipping information, etc.). The payment site 330 can use the purchaser 350 credit account and the information previously provided by purchaser 350 to streamline the purchase transaction with pre-defined purchaser preferences. Similarly, the payment site 330 can use the merchant site 340 account and the information previously provided by merchant to streamline the purchase transaction with pre-defined merchant preferences (e.g. wire transfer of funds to another account, etc.). Once the merchant site 340 receives confirmation of the transfer of funds to the merchant account, the merchant can inform the purchaser 350 and complete the purchase transaction. If the purchase transaction is not approved by the payment site 330, the payment site 330 provides notice to the merchant site 340, which so notifies the purchaser 350.

Referring to FIG. 6, an alternative embodiment is shown wherein the payment processor 345 is loosely coupled to the merchant site 340 either through an indirect connection to a merchant site 340 server or coupled to the merchant site 340 via a secure network connection. In this equivalent embodiment as described above, the payment processor 345 handles the receipt of the purchase transaction from a purchaser 350 via merchant site 340 and performs the pre-processing of the transaction prior to forwarding the purchase transaction to the payment site 330. In other respects, the purchaser 350 purchase transaction is processed as described above.

Figure 7:
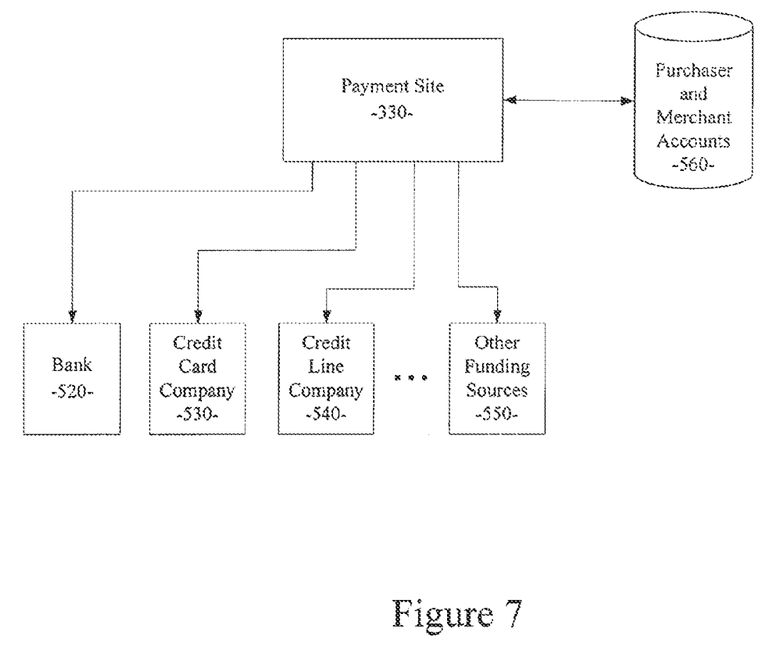
FIG. 7 illustrates a payment site configuration according to various example embodiments.

FIG. 7 illustrates that payment site 330 may be connected to one or more financial sites 520-550 (e.g. banks, credit card companies, credit line companies, or other funding sources), which can be used to handle the conventional processing of the purchaser and merchant accounts and the transfer of funds therebetween. Payment site 330 can also be connected to a purchaser and merchant account database 560 that can be used to store purchaser-specific and merchant-specific information related to the purchaser credit accounts and the merchant accounts. This information can be used to manage the purchaser and merchant accounts, verify purchaser and merchant identity, and streamline the purchase transaction for the purchaser and the merchant.

Figure 8:
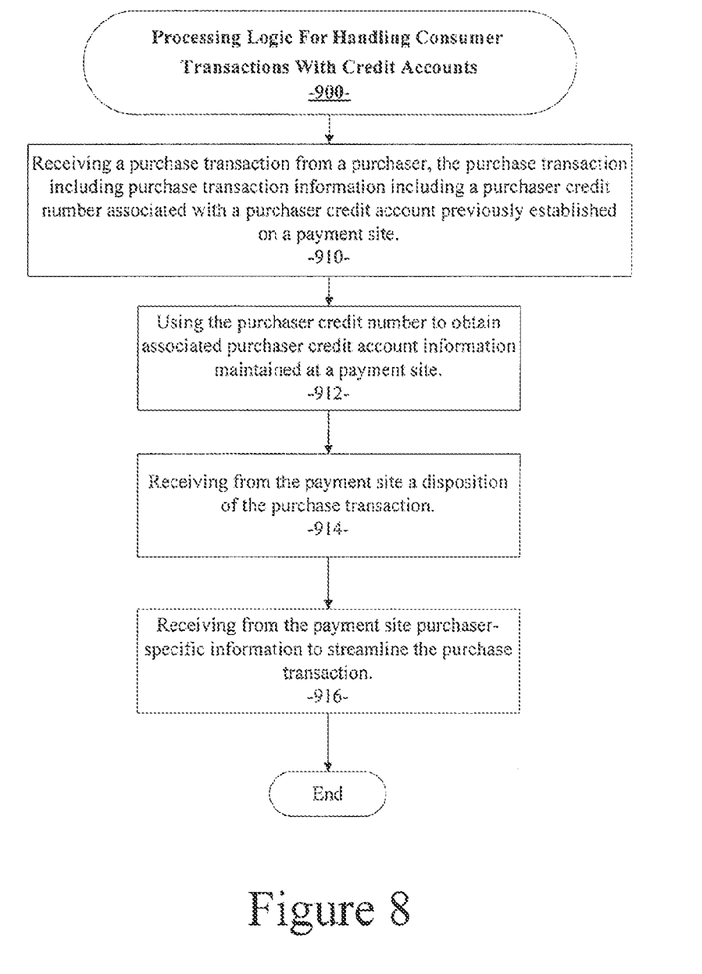
FIG. 8 is a flow diagram illustrating the processing flow in various embodiments.

FIG. 8 is a flow diagram illustrating the processing flow in various embodiments. Referring to FIG. 8, an example embodiment of processing operations performed by a payment site is illustrated. In processing block 910, the merchant site 340 receives a purchase transaction from a purchaser 350, the purchase transaction including purchase transaction information including a purchaser credit number associated with a purchaser credit account previously established on a payment site. In processing block 912, the purchaser credit number is used to obtain associated purchaser credit account information maintained at a payment site. In processing block 914, the payment site 330 processes the purchase transaction and provides a disposition of the purchase transaction (e.g. approval or denial of the transfer of purchaser funds). In processing block 916, payment site 330 also provides purchaser-specific information to streamline the purchase transaction. In alternative embodiments, the purchaser 350 can also be prompted for a CVV. In other alternative embodiments, the payment site 330 can also provide merchant-specific information to streamline the purchase transaction.

Figure 9:
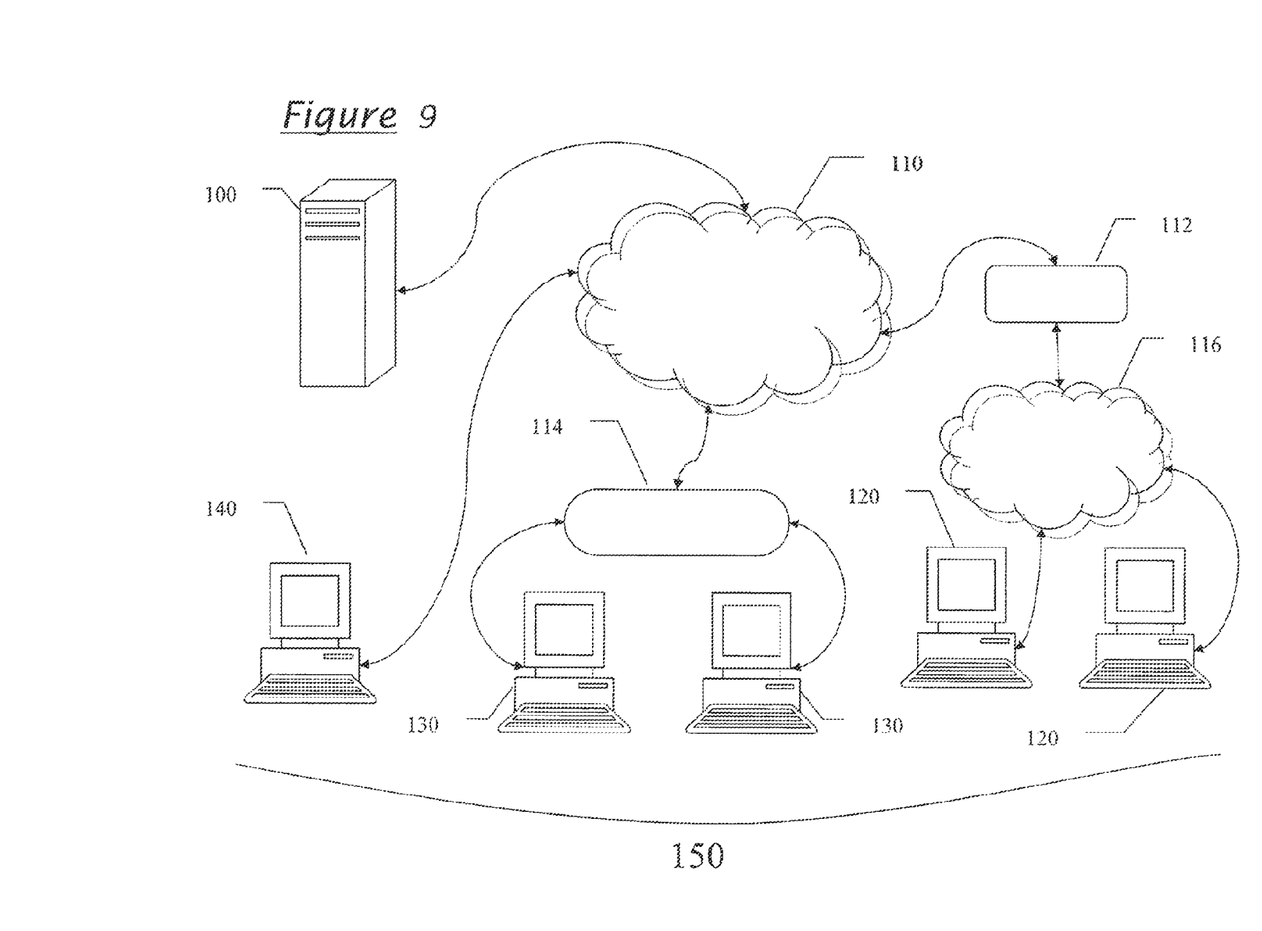
FIG. 9 is a block diagram of a network system on which an embodiment may operate.

Referring now to FIG. 9, a diagram illustrates a network environment in which various example embodiments may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 10:
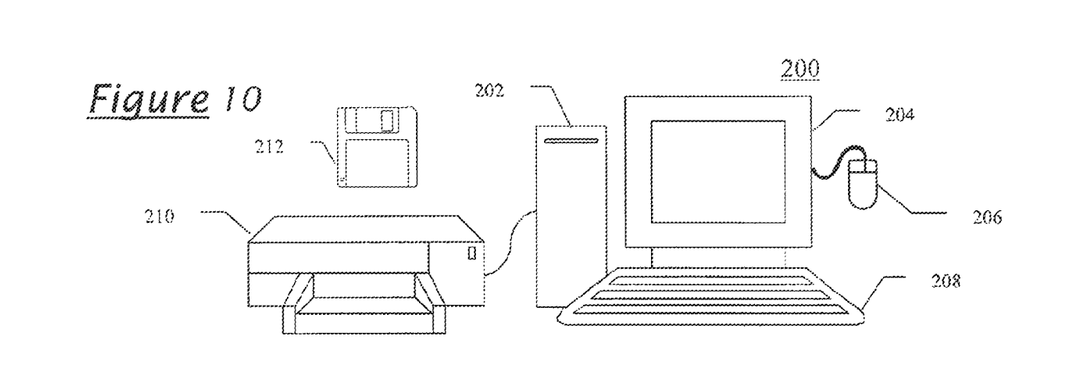
FIGS. 10 and 11 are block diagrams of a computer system on which an embodiment may operate.
Figure 11:
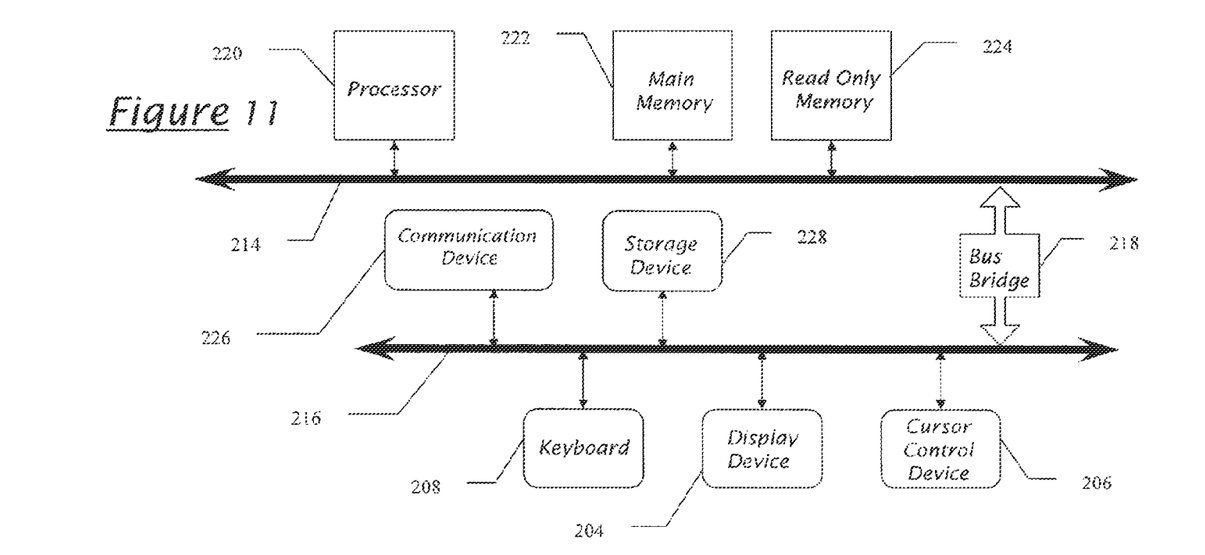

Having briefly described one embodiment of the network environment in which an example embodiment may operate, FIGS. 10 and 11 show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 9 and described above.

The system of an example embodiment includes software, information processing hardware, and various processing steps, which will be described below. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hardwired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented method and system for correlating advertisement click events with purchase events are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A computer-implemented method for execution by a data processor, the method comprising:
receiving a purchase transaction from an on-line purchaser in an online purchase transaction via a digital network interface, the purchase transaction including purchase transaction information including a purchaser credit number uniquely associated with a purchaser credit account previously established on a payment site, the purchaser credit number being defined by the purchaser when the purchaser credit account is created, the purchaser credit number uniquely associating the purchaser with the corresponding purchaser credit account on the payment site, the purchaser credit number being different from existing credit card numbers, the purchaser credit number being any unique variable-length combination of letters, numbers, or symbols, the purchaser credit number for controlling access privileges and an access process for particular merchants to access the purchaser credit account, the access privileges and access process for particular merchants being readily modifiable by the purchaser at the payment site;
using the data processor to process the purchaser credit number to obtain associated purchaser credit account information maintained at the payment site;
receiving from the payment site a disposition of the purchase transaction; and
receiving from the payment site purchaser-specific information to streamline the purchase transaction.

2. The method as claimed in claim 1 further including receiving from the payment site merchant-specific information to streamline the purchase transaction.

3. The method as claimed in claim 2 further including receiving a credit verification value (CVV) from the purchaser, the CVV being readily modifiable by the purchaser at the payment site.

4. The method as claimed in claim 1 wherein the purchaser credit account includes purchaser configurable preferences.

5. The method as claimed in claim 4 wherein the purchaser configurable preferences include security preferences.

6. The method as claimed in claim 4 wherein the purchaser configurable preferences include an identification of authorized merchants.

7. The method as claimed in claim 6 wherein the purchaser configurable preferences include a transaction authorization process associated with at least one identified authorized merchant.

8. The method as claimed in claim 4 wherein the purchaser configurable preferences include shipping preferences.

9. The method as claimed in claim 1 further including:
enabling purchaser log in at the payment site; and
enabling purchaser modification of the purchaser credit account information maintained at the payment site.

10. An article of manufacture comprising a non-transitory machine-readable medium having machine executable instructions embedded thereon, which when executed by a machine, cause the machine to:
receive a purchase transaction from an on-line purchaser in an online purchase transaction, the purchase transaction including purchase transaction information including a purchaser credit number uniquely associated with a purchaser credit account previously established on a payment site, the purchaser credit number being defined by the purchaser when the purchaser credit account is created, the purchaser credit number uniquely associating the purchaser with the corresponding purchaser credit account on the payment site, the purchaser credit number being different from existing credit card numbers, the purchaser credit number being any unique variable-length combination of letters, numbers, or symbols, the purchaser credit number for controlling access privileges and an access process for particular merchants to access the purchaser credit account, the access privileges and access process for particular merchants being readily modifiable by the purchaser at the payment site;

use the purchaser credit number to obtain associated purchaser credit account information maintained at the payment site;

receive from the payment site a disposition of the purchase transaction; and receive from the payment site purchaser-specific information to streamline the purchase transaction.

11. The article of manufacture as claimed in claim 10 further operable to receive from the payment site merchant-specific information to streamline the purchase transaction.

12. The article of manufacture as claimed in claim 10 further operable to receive a credit verification value (CVV) from the purchaser, the CVV being readily modifiable by the purchaser at the payment site.

13. The article of manufacture as claimed in claim 10 wherein the purchaser credit account includes purchaser configurable preferences.

14. The article of manufacture as claimed in claim 13 wherein the purchaser configurable preferences include security preferences.

15. The article of manufacture as claimed in claim 13 wherein the purchaser configurable preferences include an identification of authorized merchants.

16. The article of manufacture as claimed in claim 15 wherein the purchaser configurable preferences include a transaction authorization process associated with at least one identified authorized merchant.

17. The article of manufacture as claimed in claim 13 wherein the purchaser configurable preferences include shipping preferences.

18. The article of manufacture as claimed in claim 10 further operable to:

enable purchaser log in at the payment site; and enable purchaser modification of the purchaser credit account information maintained at the payment site.

19. A system comprising:

a processor;

a memory coupled to the processor to store information related to a purchaser and a merchant; and a payment processor operably coupled with the processor and the memory, operable to:

receive a purchase transaction from an on-line purchaser in an online purchase transaction, the purchase transaction including purchase transaction information including a purchaser credit number uniquely associated with a purchaser credit account previously established on a payment site, the purchaser credit number being defined by the purchaser when the purchaser credit account is created, the purchaser credit number uniquely associating the purchaser with the corresponding purchaser credit account on the payment site, the purchaser credit number being different from existing credit card numbers, the purchaser credit number being any unique variable-length combination of letters, numbers, or symbols, the purchaser credit number for controlling access privileges and an access process for particular merchants to access the purchaser credit account, the access privileges and access process for particular merchants being readily modifiable by the purchaser at the payment site;

use the purchaser credit number to obtain associated purchaser credit account information maintained at the payment site;

receive from the payment site a disposition of the purchase transaction; and receive from the payment site purchaser-specific information to streamline the purchase transaction.

20. The system as claimed in claim 19 further operable to receive from the payment site merchant-specific information to streamline the purchase transaction.

21. The system as claimed in claim 19 further operable to receive a credit verification value (CVV) from the purchaser, the CVV being readily modifiable by the purchaser at the payment site.

22. The system as claimed in claim 19 wherein the purchaser credit account includes purchaser configurable preferences.

23. The system as claimed in claim 22 wherein the purchaser configurable preferences include security preferences.

24. The system as claimed in claim 22 wherein the purchaser configurable preferences include an identification of authorized merchants.

25. The system as claimed in claim 24 wherein the purchaser configurable preferences include a transaction authorization process associated with at least one identified authorized merchant.

26. The system as claimed in claim 22 wherein the purchaser configurable preferences include shipping preferences.

27. The system as claimed in claim 19 further operable to:

enable purchaser log in at the payment site; and enable purchaser modification of the purchaser credit account information maintained at the payment site.

* * * * *